(12) United States Patent
Brockett et al.

(10) Patent No.: US 10,006,607 B1
(45) Date of Patent: Jun. 26, 2018

(54) MODULAR MULTI-APERTURE REFLECTOR SHEETS FOR LIGHT DISTRIBUTION AND CONTROL

(71) Applicant: SPL Industries USA, Inc., Encino, CA (US)

(72) Inventors: Timothy J. Brockett, Malibu, CA (US); Douglas A. Doughty, Gilroy, CA (US); Gregg A. Hollingsworth, Tempe, AZ (US); Mehran Matloubian, Encino, CA (US)

(73) Assignee: SPL INDUSTRIES USA, INC., Encino, CA (US)

( * ) Notice: Subject to any disclaimer, the term of this patent is extended or adjusted under 35 U.S.C. 154(b) by 99 days.

(21) Appl. No.: 15/270,313

(22) Filed: Sep. 20, 2016

(51) Int. Cl.

| | |
|---|---|
| *F21V 7/00* | (2006.01) |
| *F21V 7/10* | (2006.01) |
| *F21V 11/14* | (2006.01) |
| *F21V 13/10* | (2006.01) |
| *A01G 7/04* | (2006.01) |
| *A01G 9/20* | (2006.01) |
| *F21V 14/04* | (2006.01) |
| *F21S 8/08* | (2006.01) |

(52) U.S. Cl.
CPC ................ *F21V 7/10* (2013.01); *A01G 7/045* (2013.01); *A01G 9/20* (2013.01); *F21V 7/0033* (2013.01); *F21V 7/0066* (2013.01); *F21V 11/14* (2013.01); *F21V 13/10* (2013.01); *F21S 8/085* (2013.01); *F21V 14/04* (2013.01)

(58) Field of Classification Search
CPC ......... A01G 7/045; F21V 7/10; F21V 7/0033; F21V 7/0066; F21V 11/14
See application file for complete search history.

(56) References Cited

U.S. PATENT DOCUMENTS

| | | | | |
|---|---|---|---|---|
| 5,743,633 | A * | 4/1998 | Chau ................... | G06K 7/10742 235/462.06 |
| 6,106,137 | A * | 8/2000 | Adams ................. | F21S 48/215 257/98 |
| 8,690,380 | B2 * | 4/2014 | Sato ........................ | F21V 7/22 362/217.05 |
| 2017/0241622 | A1 * | 8/2017 | Du ........................ | F21V 14/003 |

* cited by examiner

*Primary Examiner* — Karabi Guharay
(74) *Attorney, Agent, or Firm* — Richard T. Ogawa; Ogawa P.C.

(57) ABSTRACT

A system of modular multi-aperture reflector sheets for use in general and specialty luminaires is disclosed. These sheets, designed to be simple in design, manufacture, and installation, allows for enhancing, adjusting, varying, or correction of the light distribution provided by luminaires during production or deployment. The reflector sheets are made of highly-reflective, thin material and feature multiple apertures that are patterned to redirect the light output emerging from the output of a luminaire. The reflector sheets are intended to be used in combination with both standard and custom reflectors and replace complicated and expensive lenses and optics that are often deployed to modify luminaire light distribution. The sheets are modular and can be replaced easily, allowing for standard luminaires having multiple possible light distribution patterns without further complication. Also, custom multi-aperture reflector sheets can be designed, shipped, and installed easily if further modification or correction of the light distribution is desired.

23 Claims, 7 Drawing Sheets

MODULAR MULTI-APERTURE REFLECTOR SHEETS FOR LIGHT DISTRIBUTION AND CONTROL

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention is directed to devices and methods for light distribution and control using modular multi-aperture reflector sheets in conjunction with luminaires. Merely by way of example, such luminaires can be utilized in such applications as parking lots, street lights, warehouses, stadiums, security, ports and harbors, large and small buildings, vehicle headlamps, billboard lighting, building facade lighting, airports, bridges, agriculture and horticulture lighting, architectural lighting, stage and entertainment lighting, medical illumination, microscopes, projectors and displays, ultraviolet (UV) water treatment, UV curing, any combination of these, and the like.

Light distribution is a common critical design parameter for lighting installations. Any installation project, be a parking lot, airport, or horticulture grow-house, requires custom, and often largely varied, light distribution based on safety, practical, and performance considerations. Individual luminaires are often fitted with optics such as reflectors, lenses, or a combination of these or similar devices to achieve the desired light distribution for a given application. Due to the unique requirements of most individual installations, it often requires several separate and unique optical reflectors and/or lenses to achieve the desired light distribution.

Complications arise in luminaire design and manufacturing when considering the required optics for many lighting installations. Often luminaire manufacturers need to have available in inventory multiple designs of reflectors and lenses with varying light distributions. Luminaires must be designed and manufactured to accommodate all the different optic designs and can add considerable design and manufacturing complication and ultimately more cost in both development and production of the luminaires. In some cases the dimensions of the luminaire can not accommodate using the reflector that is necessary to achieve the desired light distribution. In other cases, unique lenses are used in combination with standard reflectors to achieve desired light distribution. These lenses can be complicated in design and must be manufactured separately adding considerable cost to the luminaire as well.

Additional issues arise with light sources that produce UV light or an application that requires or desires UV light such as curing applications or horticulture grow installations. To save cost, lenses are usually made of plastic which UV degrades. Glass lenses block UV light, preventing or significantly reducing its transmission to its desired location.

In this invention, we introduce a modular system of multi-aperture reflective sheets that can be used in combination with standard or custom reflectors and other optical components to enhance, adjust, vary, or correct light distribution of a luminaire. The use of multi-aperture reflective sheets is aimed to accomplish several improvements for production and performance of luminaires. These include: 1. Reduce the complications that arise when attempting to accommodate multiple reflector and lens designs during development and manufacturing of luminaires; 2. Reduce cost in optical design by allowing the multi-aperture reflector sheets to enhance or adjust light distribution in combination with standard, simpler, and lower cost reflector designs; 3. Eliminate the use of complicated, difficult to produce, and costly lens designs with luminaires; 4. Simplify the process to change the light distribution pattern of a luminaire on site, 5. Allow UV light transmission which traditional glass or plastic lens typically block or absorb, and, 6. Allow the use of more compact luminaire designs to achieve the desired light distribution using smaller reflectors.

BRIEF SUMMARY OF THE INVENTION

Herein is a disclosure for a system of modular multi-aperture reflector sheets used in the context of general and specialty luminaires. Multi-aperture reflector sheets are highly reflective, thin planar sheets that are purposely patterned with multiple apertures to enhance, adjust, vary, or correct the light distribution of a luminaire. They can also be described as a reflective member, with distributed emitting elements spatially disposed to allow the transmission of infrared, visible, and UV light. They are intended to be used in combination with reflectors and other optical components of a luminaire or on their own. The sheets are designed to be easy to manufacture, made of common materials, and be inexpensive to design and produce. In addition, the reflector sheets would be designed to be modular, allowing easy installation and replaceable in luminaires. Each design would allow a particular light distribution pattern that could be chosen by the one installing the luminaire on site, optimizing the light distribution to cover the areas where it is so desired. Custom reflector sheets could be designed for individual installations and be inexpensive and easy to produce, ship, and install.

The reflector sheets are intended to provide important advantages over the common optics that luminaires currently use. A distinct advantage of this invention is that the reflector sheets can be used to modify or adjust the light distribution of a standard or common reflector, allowing for several different light distributions for the same luminaire. Thus, a single luminaire and reflector design can be used for several different light distributions, the only difference being a low-cost, modular, simple to install reflector sheet on the light aperture of the luminaire. This can reduce the number of different luminaire and reflector designs, saving cost, reducing inventory, and mitigating complication in the design and production of the luminaire. Another distinct advantage is that this invention can replace lens systems that are commonly used on luminaires with inexpensive and simple reflector sheets. This can also reduce cost and eliminate the need to develop, manufacture, or stock complicated lens systems. In addition, most lens use material (plastic or glass) that can block certain types of light such as UV. For applications that require or desire UV, such as UV curing or horticulture installations, a reflector sheet, transparent to UV, is a good alternative.

The reflector sheets can be used in luminaires that provide lighting for, but not limited to, the following applications:

Parking lots, street lights, warehouses, stadiums, security, ports and harbors, large and small buildings, vehicle headlamps, billboard lighting, building facade lighting, airports, bridges, agriculture and horticulture lighting, architectural lighting, stage and entertainment lighting, medical illumination, microscopes, projectors and displays, ultraviolet (UV) water treatment, UV curing, any combination of these, and the like.

The present invention achieves these benefits and others in the context of known process technology. However, a further understanding of the nature and advantages of the present invention may be realized by reference to the attached drawings.

BRIEF DESCRIPTION OF THE DRAWINGS

A more complete understanding of the present invention and its advantages will be gained from a consideration of the following description of preferred embodiments, read in conjunction with the accompanying drawings provided herein. In the figures and description, numerals indicate various features of the invention, and like numerals referring to like features throughout both the drawings and the description.

DETAILED DESCRIPTION OF THE INVENTION

Figure 1:
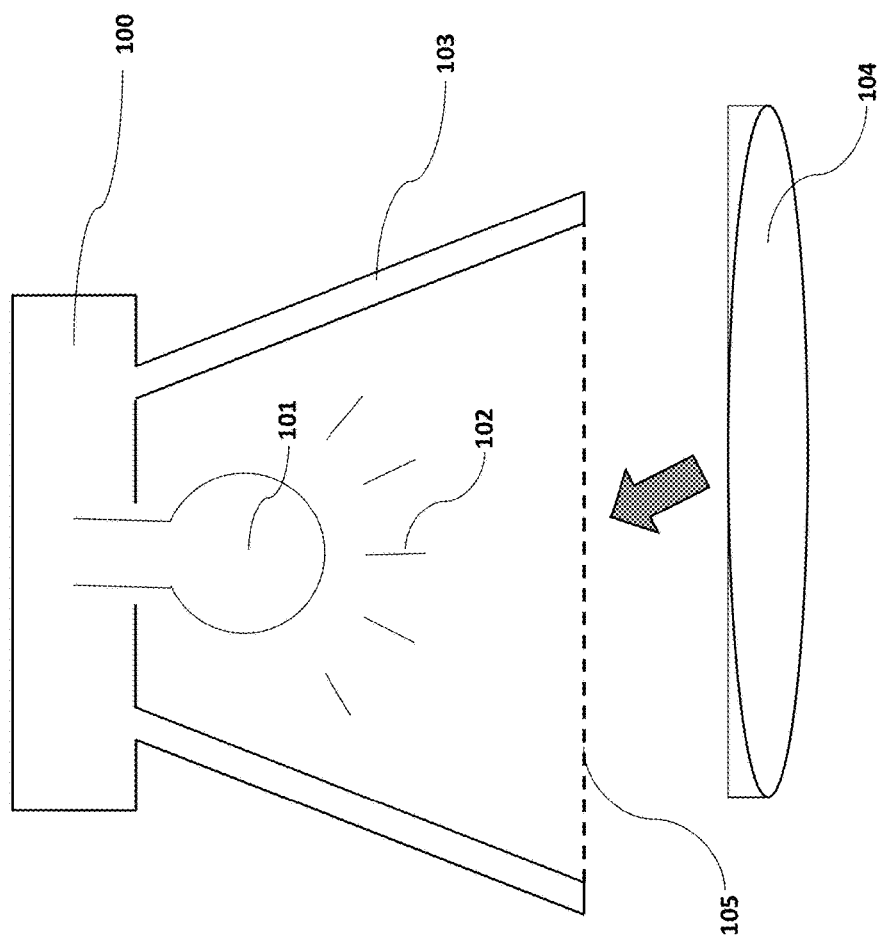
FIG. 1 is a drawing of a common luminaire. It shows the light-emitting element mounted upon a luminaire base and substantially surrounded by a reflector. A lens, shown below the luminaire, has the option of being placed and fastened to the opening of the reflector to modify the light distribution of the luminaire, if so desired.

Multi-aperture reflector sheets are intended to be used in luminaires with standard optics such as reflectors. In general, a luminaire includes a housing that comprises of a light-emitting member, such as a light bulb, high-intensity discharge lamp, or fluorescent tube and a reflector that substantially surrounds the light-emitting member. An aperture at one end of the reflector allows the light to output in a particular direction based on the configuration between the light-emitting member and the reflector. The light that is released from the luminaire is directed towards a target and resultant illumination on the target is often called its "light distribution". Control of a luminaire's light distribution is a critical aspect when designing a lighting installation. To aide in this aspect, optical designers often have to provide several distinct reflector designs for each luminaire, taking into account the type of light-emitting member, desired light distribution, and any mechanical or performance requirements or limitations.

Since most lighting installations have unique light distribution requirements, it becomes difficult for luminaire manufacturers to provide an optimal light distribution for every installation that their luminaires are used in. As such, lighting designers must make sacrifices in performance or increase costs to satisfy the requirements for their installations. Often, other optical components are added to provide adjustments to the luminaires standard light distribution. Popular components include both lenses and secondary reflectors, however, these extra components are both cost and complication to the luminaire. In other cases, mechanical adjustment options are added to the luminaires which also add costs and complication.

Here in this invention, we disclose a system of modular multi-aperture reflector sheets that, when used in conjunction with luminaires, can provide the flexibility of adjusting, enhancing, varying, or correcting light distribution of standard or common reflectors, providing a cost-effective and easy way of optimizing optical performance of a luminaire. A multi-aperture reflector sheet is comprised of a thin reflective material with a plurality of light-transmitting apertures (or elements) spatially distributed and patterned on its surface to provide a particular light transmission profile. The sheet can be made of any reflective material, such as polished metal, ceramic, or dielectric and ideally must reflect more than 85% to 99% of incident light. The sheet can be of any shape and size, however, it is envisioned to be placed on the output aperture of the luminaire and must be able to redirect, partially or wholly, the light emanating from the luminaire's reflector. The typical thickness of the sheet is approximately 0.25 millimeters to 0.5 millimeters. The sheet can be manufactured by, but not limited to, the following processes: Etching, machining, stamping, extrusion, casting, forging, laser-cutting, or similar methods.

The light-transmitting apertures on the sheet should be spatially distributed and patterned on the surface of the sheet. The location, size, and shape of each aperture is primarily determined by the desired light output of the sheet and is designed along with the reflector and luminaire that it will be incorporated with. Possible shapes of the apertures could be, but not limited by, squares, circles, ovals, triangles, rectangles, or other regular or irregular shapes. The size of the apertures can be 0.1 millimeters to the extents of the sheet itself, however, more typical dimensions would be several millimeters in width or diameter. The apertures themselves should be comprised of free space; although it is possible to have light-transmitting material inside the apertures, such embodiments add cost and could reduce light transmission.

The sheet embodiment is normally designed to be modular, allowing for the sheets to be easily installed on the output aperture of the luminaire. The modular design also allows for easy removal and replacement of sheets. This provides a platform for a lighting designer to choose the optimal light distribution for their application by choosing an appropriate reflector sheet to install on each individual luminaire they plan to deploy. Choice of the sheet can be done before or after deployment of the luminaire, allowing the designer to optimize for the application on site, if so desired.

The concept behind the operation of the reflector sheet is as follows: Light-rays emanating from the light-emitting member illuminate the reflector sheet or reflect off the reflector and illuminate the reflector sheet. Depending on the location on the sheet the light-ray illuminates, the light-ray either transmits through an aperture or reflects off the sheet. The light-rays that reflect off the sheet then re-illuminate the reflector at a different location where the light-ray reflects again and has another chance to transmit through an aperture on the sheet. Depending on the location, size, and shape of the apertures, different light-transmitting profiles can be achieved, effectively adjusting, enhancing, or correcting the light distribution of the luminaire.

Several advantages are provided with the use of modular multi-aperture reflector sheets. Firstly, the sheets reduce the complications that arise when attempting to accommodate multiple reflector and lens designs during development and manufacturing of luminaires. Secondly, the multi-aperture reflector sheets allow for enhancement or adjustment of the light distribution using standard, simpler, more compact, and lower cost reflector designs. Thirdly, the sheets eliminate the need for complicated, difficult to produce, and costly lens designs. Fourth, the process to change the light distribution pattern of a luminaire on site is significantly simplified, providing flexibility for lighting designers, and finally, allows UV light transmission which traditional glass or plastic lens typically block or absorb, providing optical adjustment for UV sensitive application such as UV curing or horticulture installations.

Further understanding of the disclosed invention can be revealed from the following detailed description of the figures:

FIG. 1 is a drawing of a common luminaire. It shows the light-emitting member 101 mounted upon a luminaire base 100 and substantially surrounded by a reflector 103. The light produced by the light-emitting member 101 is shown as 102. These light-rays reflect off the reflector 103 where they escape out of the opening of the reflector 105. An optional lens 104 is shown below the luminaire. The lens can be attached to the opening of the reflector 105 where it can refract the light and adjust the light distribution provided by the luminaire.

Figure 2:
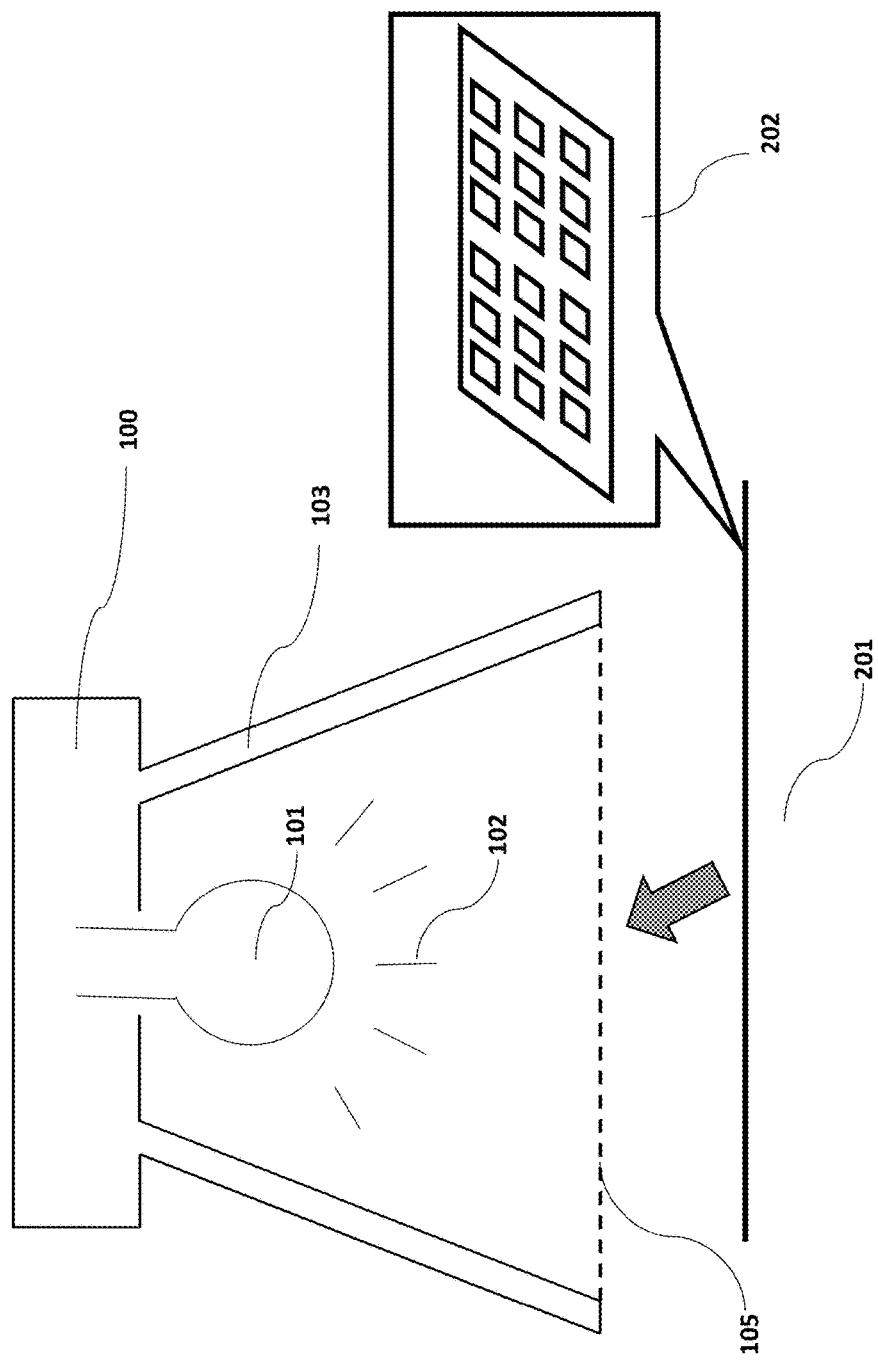
FIG. 2 is a drawing of the same common luminaire of FIG. 1, however, instead of a lens, a multi-aperture reflector sheet is present that can be placed and fastened to the output of the luminaire. A modular system that allows for simple attachment and removal of several different designs of reflector sheets permits changing the light distribution of the luminaire quickly and at lower cost than a traditional lens.

FIG. 2 is a drawing of the same common luminaire of FIG. 1, however, instead of a lens, a multi-aperture reflector sheet 201 is present that can be placed and fastened to the opening of the reflector 105. An example of the reflector sheet is shown in inset 202. The reflector sheet is designed to be modular so that if a different light distribution is desired, it can be easily replaced with another reflector sheet.

Figure 3B:
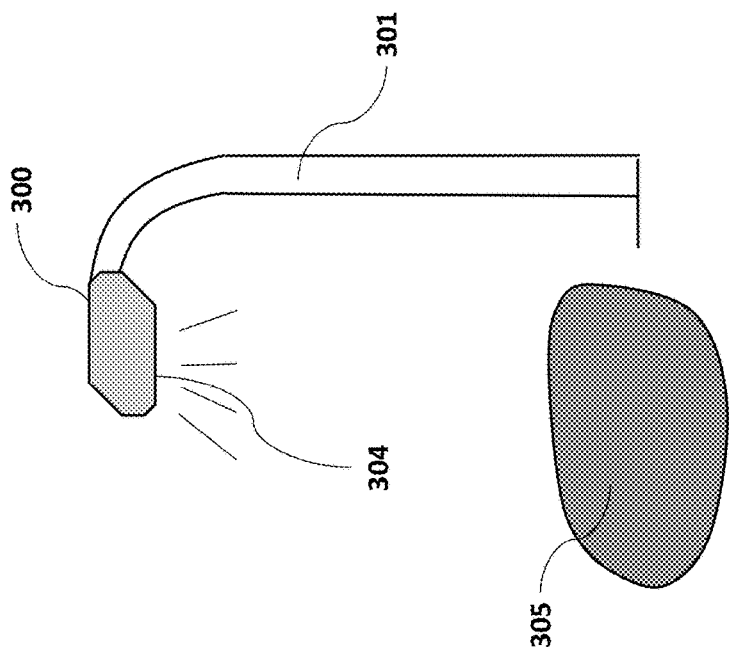
FIG. 3B is a drawing of the same luminaire and pole of FIG. 3A, however, a different reflector sheet is installed on the output of the luminaire. A different light distribution below the luminaire is achieved using the different reflector sheet.
Figure 3A:
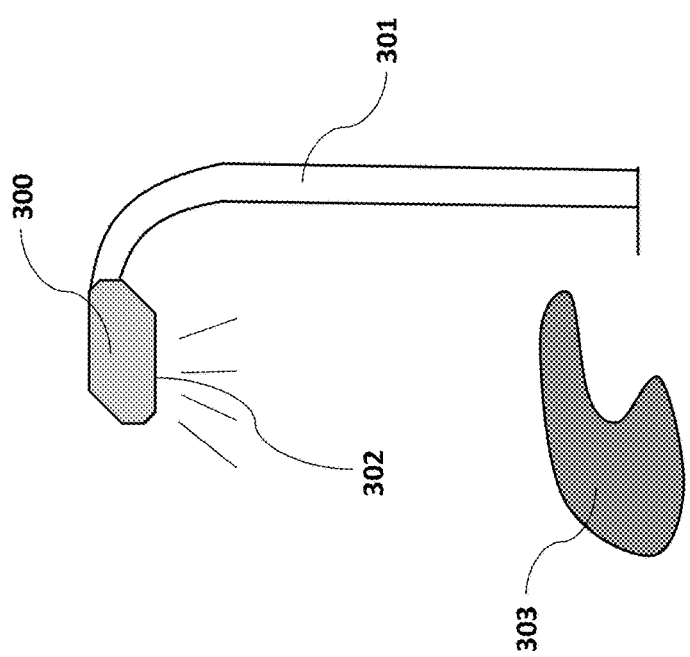
FIG. 3A is a drawing of a luminaire that is installed on a pole. A particular reflector sheet provides a particular light distribution on the ground underneath the luminaire.

FIG. 3A is a drawing of a luminaire 300 that is installed on a pole 301. A particular reflector sheet 302 that is attached to the output of the luminaire 300 provides a particular light distribution 303 on the ground underneath the luminaire.

The light distribution is primarily determined by the reflector and optics of the luminaire and the reflector sheet attached to the output of the luminaire.

FIG. 3B is a drawing of the same luminaire 300 and pole 301 of FIG. 3A, however, a different reflector sheet 304 is installed on the output of the luminaire. Since the design of the different reflector sheet 304 is different from the reflector sheet of FIG. 3A, the light distribution 305 underneath the luminaire 300 is different than FIG. 3A. The reflector sheets are designed to be modular so that any sheet can be placed at the output of the luminaire to provide the desired light distribution.

Figure 4:
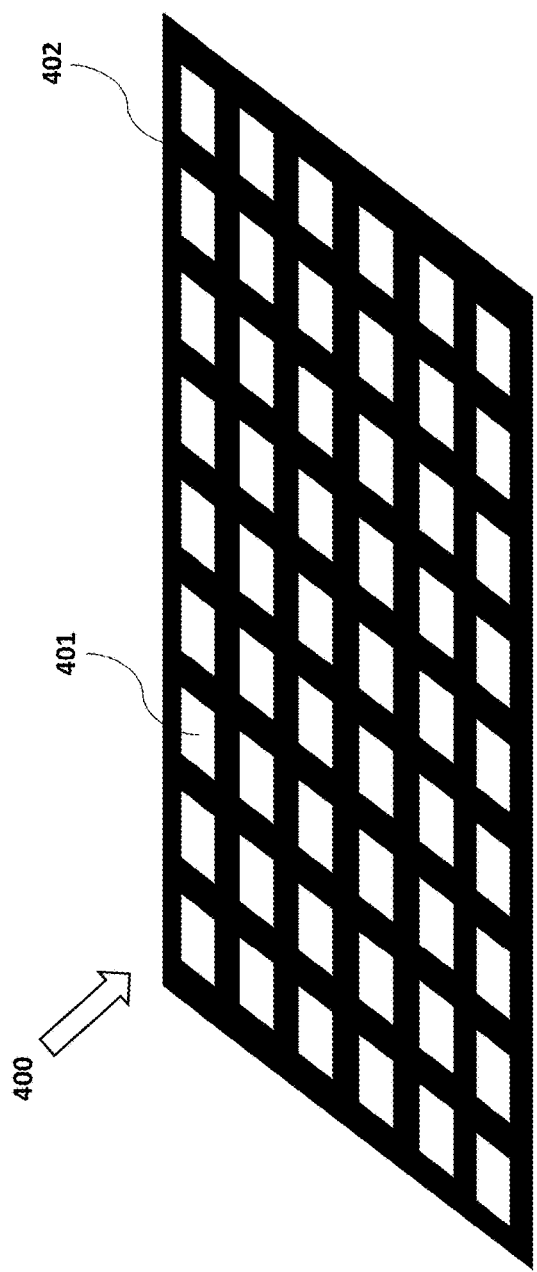
FIG. 4 is a drawing of an embodiment of this invention. In this embodiment, the multi-aperture reflector sheet has a uniform pattern of square openings that provides a particular light distribution when placed on the output of a luminaire.

FIG. 4 is a drawing of an embodiment of a particular design of a multi-aperture reflector sheet. In this embodiment, the multi-aperture reflector sheet 400 has a uniform pattern of square openings 401 that provides a particular light distribution when placed at the output of a luminaire. The surface of the sheet 402 should be highly reflective for visible and/or UV light with a reflectivity of greater than 95% preferable.

Figure 5:
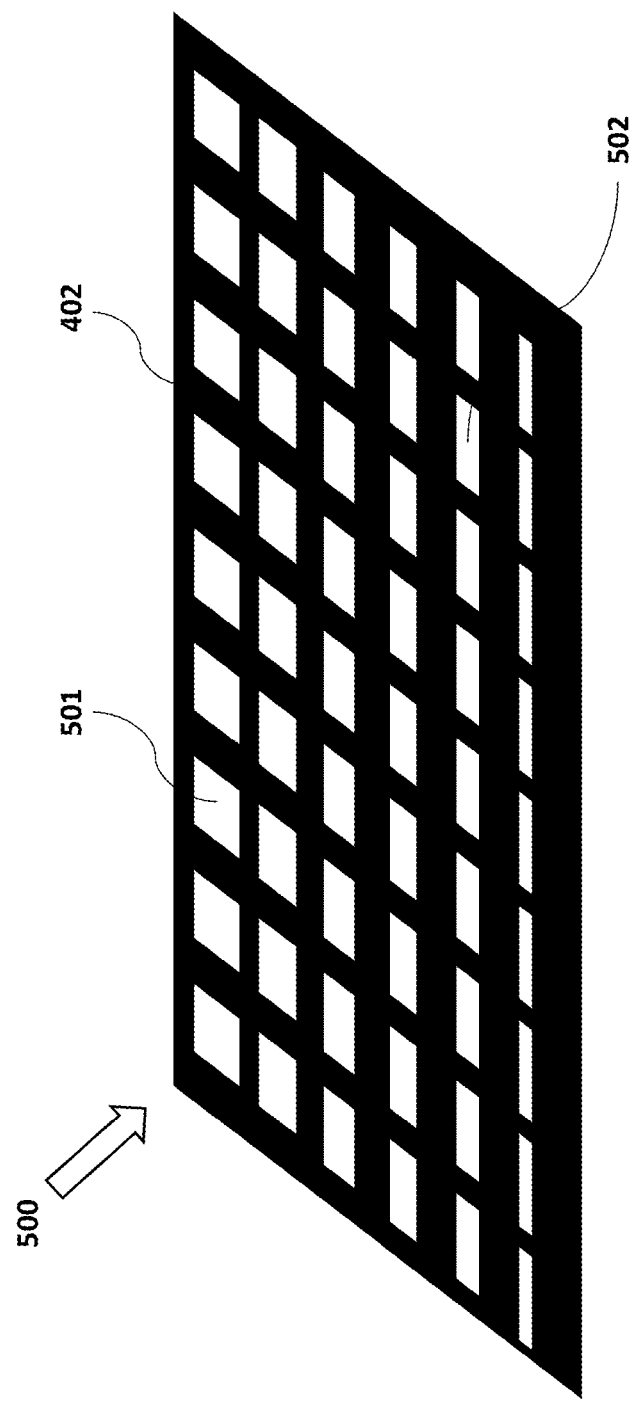
FIG. 5 is a drawing of another embodiment of this invention. In this embodiment, the multi-aperture reflector sheet has a pattern that is a gradient of smaller to larger square openings that provides a particular light distribution when placed on the output of a luminaire.

FIG. 5 is a drawing of another embodiment of this invention. In this embodiment, the multi-aperture reflector sheet 500 has a pattern that is a gradient of large square openings 502 to larger square openings 501 that provides a particular light distribution when placed at the output of a luminaire. The highly reflective surface 402 allows for low loss of light from the luminaire.

Figure 6:
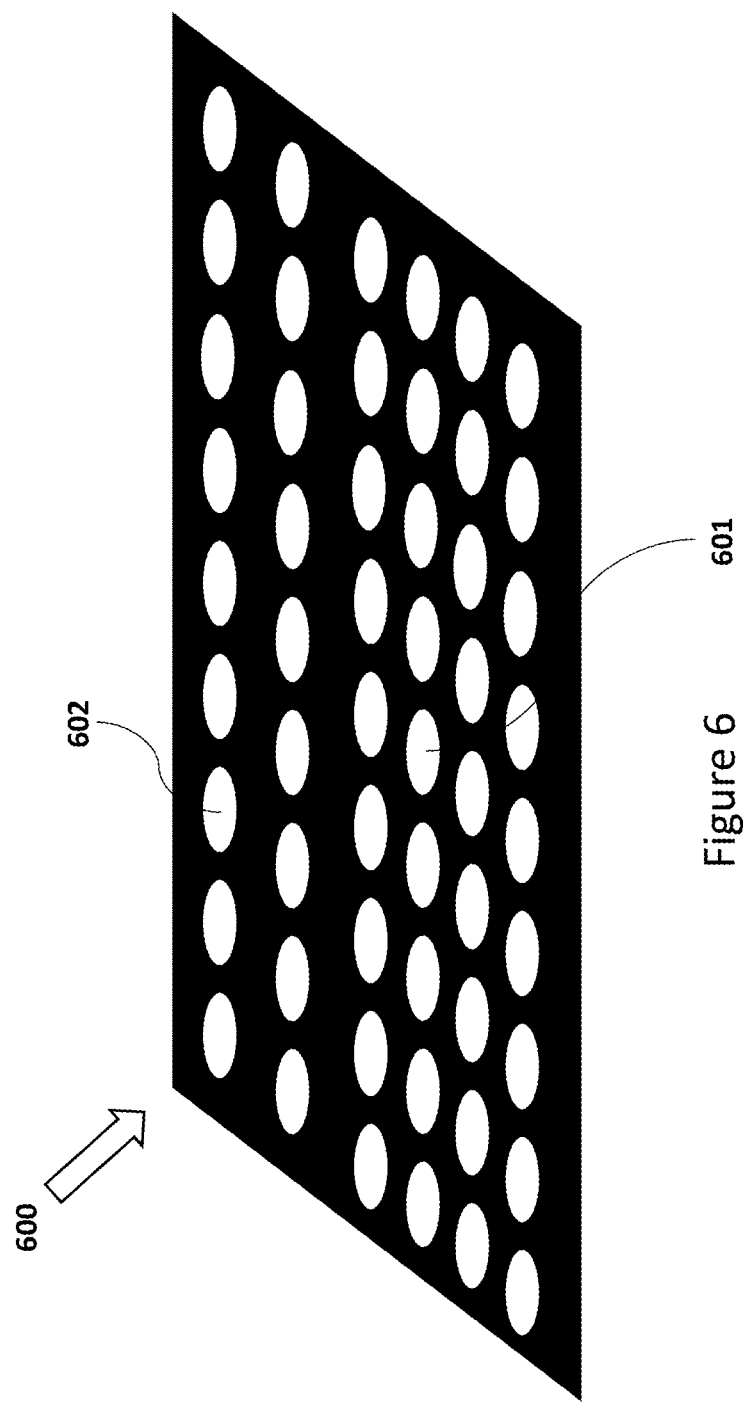
FIG. 6 is a drawing of another embodiment of this invention. In this embodiment, the multi-aperture reflector sheet has a pattern where one end has a greater density of circular openings and the other end has a lesser density of circular openings that provides a particular light distribution when placed on the output of a luminaire.

FIG. 6 is a drawing of another embodiment of this invention. In this embodiment, the multi-aperture reflector sheet 600 has a pattern where one end has a greater density of circular openings 601 and the other end has a lesser density of circular openings 602 that provides a particular light distribution when placed on the output of a luminaire.

Figure 7:
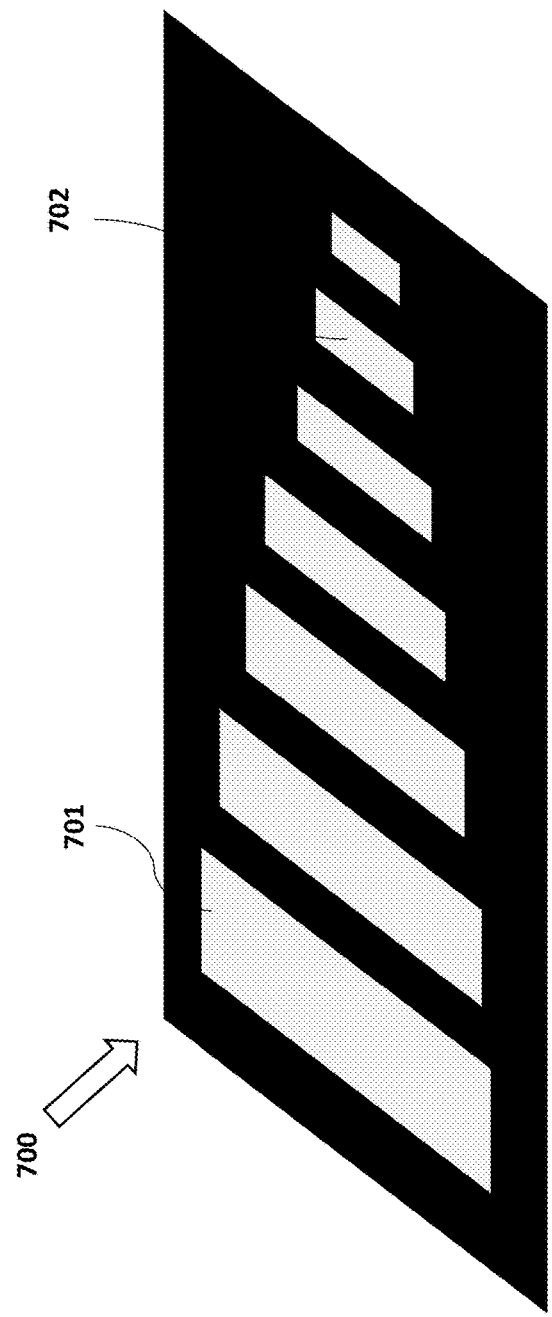
FIG. 7 is a drawing of another embodiment of this invention. In this embodiment, the multi-aperture reflector sheet has a gradient of large rectangular slots from longer slots to shorter slots that provides a particular light distribution when placed on the output of a luminaire.

FIG. 7 is a drawing of another embodiment of this invention. In this embodiment, the multi-aperture reflector sheet 700 has a gradient of large rectangular slots 701 from longer slots to shorter slots 702 that provides a particular light distribution when placed on the output of a luminaire.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A lens-less luminaire apparatus, the apparatus comprising:
  a housing body;
  a light-emitting member provided within the housing body;
  a first reflector member provided within an interior region of the housing body, the reflector being configured within the housing body within the vicinity of the light-emitting member to substantially surround the light-emitting member causing electromagnetic radiation in the form of infrared, visible, and UV light from the light-emitting member to be reflected toward a direction;
  an aperture region that allows electromagnetic radiation to be output from the interior region;
  a second reflector member comprising a reflecting surface facing the interior region of the housing body, and the second reflector member being affixed to cover the aperture region;
  a thickness ranging from 0.25 millimeter to 1 centimeter characterizing a width of the second reflector member;

a plurality of emitting elements, each of which is spatially disposed on the second reflector member, each of the plurality of emitting elements having a spatial region that allows electromagnetic radiation generated within the interior region of the housing body to be emitted through each of the plurality of emitting elements;

a size ranging 100 micro-meters to a size that does not exceed the extents of the aperture region to characterize each of the plurality of emitting elements; and a fill factor ranging from greater than 0.1 to less than 0.99 to characterize a ratio of a first total spatial area defining a sum of the region of each of the plurality of emitting elements to a second total spatial area defining the aperture region.

2. The apparatus of claim 1 wherein the first reflector member partially surrounds the light-emitting element.

3. The apparatus of claim 1 wherein the second reflector member is modular and is mounted to the housing.

4. The apparatus of claim 1 wherein the second reflector member is removable and can be replaced easily.

5. The apparatus of claim 1 wherein the second reflector member is permanently fastened to housing.

6. The apparatus of claim 1 wherein the emitting elements are transparent to infrared, visible, and/or UV light.

7. The apparatus of claim 1 wherein each of the emitting elements is characterized by a free space.

8. The apparatus of claim 1 wherein each of the emitting elements is characterized by a shape consisting of a rectangular, a circular, a square, a triangular, a diamond, a hexagonal, an octagonal, or a combination thereof.

9. The apparatus of claim 1 wherein each of the emitting elements is arbitrarily shaped or regularly shaped.

10. The apparatus of claim 1 wherein each of the emitting elements is spatially disposed substantially within an interior of the second reflector member.

11. The apparatus of claim 1 wherein the first reflector member is made of high-reflective metal material; and wherein the second reflector member is made of high-reflective metal material, the high-reflective metal material being at least 85% reflectivity and higher to 99%.

12. The apparatus of claim 1 wherein the first reflective member is made of a high-reflective ceramic material, a high-reflective plastic material, high-reflective conductive material, or a high-reflective non-conductive material, the high-reflective material being at least 85% reflectivity and higher to 99%.

13. The apparatus of claim 1 wherein the second reflector member is a multi-aperture reflector sheet, the multi-aperture reflector sheet is made using a process selected from etching, machining, laser cutting, stamping, extrusion, molding, forging, or similar methods.

14. A lens-less luminaire apparatus for emission of visible, UV, and IR radiation while filtering RF radiation, the apparatus comprising:
a housing body;
a light-emitting member provided within the housing body;
a first reflector member provided within an interior region of the housing body, the reflector being configured within the housing body within the vicinity of the light-emitting member to substantially surround the light-emitting member causing electromagnetic radiation in the form of infrared, visible, and UV light from the light-emitting apparatus to be reflected toward a direction;

an aperture region that allows electromagnetic radiation in the form of infrared, visible, and UV light to be output from the interior region;

a second reflector member comprising a reflecting surface facing the interior region of the housing body, and second reflector member being affixed to cover the aperture region;

a conductive characteristic provided in the second reflector member, the conductive characteristic ranging from 0.5 Siemens/m to $6.2 \times 10^7$ Siemens/m;

a thickness ranging from 0.25 millimeter to 1 centimeter characterizing a width of the second reflector member;

a plurality of emitting elements, each of which is spatially disposed on the second reflector sheet member, each of the plurality of emitting elements having a spatial region that allows electromagnetic radiation in either or all of a visible, UV, or infrared range generated within the interior region of the housing body to be emitted through each of the plurality of emitting elements, while filtering substantially all RF radiation generated from the interior region;

a size ranging from 100 micro-meters to a size that does not exceed the extents of the aperture region to characterize each of the plurality emitting elements; and a fill factor ranging from less than 0.99 to greater than 0.01 characterizing a ratio of a first total spatial area defining a sum of each of the plurality of emitting elements to a second total spatial area defining the aperture region.

15. The apparatus of claim 14 wherein the first reflector member partially surrounds the light-emitting member.

16. The apparatus of claim 14 wherein the second reflector member is modular and is mounted to the housing.

17. The apparatus of claim 14 wherein the second reflector member is removable and can be replaced easily.

18. The apparatus of claim 14 wherein the second reflector member is permanently fastened to housing.

19. The apparatus of claim 14 wherein each of the emitting elements is characterized by a free space; wherein each of the emitting elements is characterized by a shape consisting of a rectangular, a circular, a square, a triangular, a diamond, a hexagonal, a octagonal, or a combination thereof.

20. The apparatus of claim 14 wherein each of the emitting elements is arbitrarily shaped or regularly shaped.

21. The apparatus of claim 14 wherein each of the emitting elements is spatially disposed substantially within an interior of the second reflector member; wherein the first reflector member is made of high-reflective metal material; and wherein the second reflector member is made of high-reflective metal material, the high-reflective metal material being at least 85% reflectivity and higher to 99%.

22. The apparatus of claim 14 wherein the first reflective member is made of a high-reflective ceramic material, a high-reflective plastic material, high-reflective conductive material, or a high-reflective non-conductive material; and wherein the second reflector member is a multi-aperture reflector sheet, the multi-aperture reflector sheet is made using a process selected etching, machining, laser cutting, stamping, extrusion, molding, forging, or similar methods.

23. A horticulture lamp apparatus, the apparatus comprising:
a housing body;
a light-emitting member provided within the housing body;
a first reflector member provided within an interior region of the housing body, the reflector being configured within the housing body within the vicinity of the light emitting member to substantially surround the light-emitting member causing electromagnetic radiation from the light emitting member to be reflected toward a direction;
an aperture region that allows electromagnetic radiation to be output from the interior region;
a second reflector member comprising a reflecting surface facing the interior region of the housing body, and second reflector member being affixed to cover the aperture region;
a thickness ranging from 0.25 millimeter to 1 centimeter characterizing a width of the second reflector member;
a plurality of emitting elements, each of which is spatially disposed on the second reflector sheet member, each of the plurality of emitting elements having a spatial region that allows electromagnetic radiation generated within the interior region of the housing body to be emitted through each of the plurality of emitting elements;
a size ranging from 100 micro-meters to a size that does not exceed the extents of the aperture region to characterize each of the plurality emitting elements; and
a fill factor ranging from greater than 0.01 to less than 0.99 characterizing a ratio of a first total spatial area defining a sum of each of the plurality of emitting elements to a second total spatial area defining the aperture region.

* * * * *